Patented Jan. 2, 1934

1,942,299

UNITED STATES PATENT OFFICE 1,942,299

ADHESIVE AND FILM FORMING COMPOSITION

Paul C. Lemmerman and William K. Schweitzer, East Cleveland, Ohio, assignors to The Grasselli Chemical Company, Cleveland, Ohio, a corporation of Delaware No Drawing. Application December 16, 1931
Serial No. 581,512

4 Claims. (Cl. 87—17)

Aqueous solutions of alkali-metal silicates have numerous applications in the arts, particularly for coatings, paints, and adhesive purposes.

Silicate solutions are difficult to apply on metallic, greasy, water repellant surfaces, or surfaces which are hard to wet. They do not form an even film, rather tending to form spherical drops.

Silicate solutions are easily decomposed by acids and other electrolytes, setting to form gels of silicic acid, whereby the solutions lose their valuable adhesive and film forming properties.

We have found that certain materials of the class of wetting agents can be incorporated into sodium silicate solutions of the type useful for adhesive and film forming purposes, and that these agents greatly reduce the surface tension of said silicate solutions.

Our invention comprises solutions of alkali metal silicates containing a wetting agent, said solutions showing a substantially lower surface tension than the same solutions free from the wetting agent.

The application of our novel silicate solutions of lowered surface tension for film forming and adhesive purposes shows decided advantages over ordinary solutions. They spread over water repellant surfaces and give complete coverage; on dehydration or drying even films of strong adhesion are produced.

The agents which we found useful for the preparation of our silicate solutions of lowered surface tension are organic substances, such as naphthalene sulfonic acids containing hydrocarbon substituents in their nucleus, and similar sulfonic acids of complex higher hydrocarbons, sulfonated oily substances, high molecular carboxylic acids, saponins, bile acids, aldehydes, esters, high boiling alcohols, etc. Esters and high boiling alcohols, such as butylacetate, amylacetate, cyclohexanol-formate, butylalcohol, amylalcohol, etc., are very slightly soluble in alkali-metal silicate solutions, but the small amounts so dissolved are sufficient to markedly decrease the surface tension of the solutions.

Chemically these various wetting agents belong to different groups of compounds, though most of them form water soluble akali-metal salts. Physically they have one characteristic in common, they lower the surface tension of aqueous solutions in which they are dissolved. These agents are furthermore characterized in that they are compatible with aqueous silicate solutions, in other words they do not decompose such solutions when added thereto in amounts up to 2%.

There are other organic substances, mainly of non-salt forming properties which lower the surface tension of aqueous solutions. Alcohols of low molecular weight, such as ethyl and methyl-alcohols are good examples of such agents; they precipitate, however, sodium silicate solutions, even in amounts of less than 1%, and are incompatible therewith. They are, therefore, of no use in our invention.

The amounts of our wetting agents needed to produce silicate solutions of substantially lowered surface tension are rather small and range from 1/1000 of 1% in certain instances to 1 or 2%. Solutions containing more than about 2% of the wetting agent are not contemplated in our invention. Their presence in the films produced is noticeable and gives to the films an oily, greasy feel which is undesired and is detrimental to the adhesion of the films.

It is noted that most of the wetting agents useful in the preparation of our novel compositions have salt forming properties. They can therefore, be added in the form of the free acids or the salts. The final product as dissolved in the alkaline silicate solutions will be practically the same.

The addition of these wetting agents to strong silicate solutions increases to a certain extent the viscosity of the solutions, but this increase of the viscosity is of such an order of magnitude that the addition of a few per cent of water to the solution restores the original viscosity without materially affecting the lowered surface tension and the value of the modified silicate solutions for adhesive film forming purposes.

Technical alkali metal silicates are produced and used in various compositions relative to the ratio of $Na_2O$ to $SiO_2$, ranging from 1:1 to over 1:4, or corresponding ratios of $K_2O$ to $SiO_2$. The silicate solutions principally used for adhesive or film forming purposes are within the range of ratios from about 1:1.5 to 1:3.5. The gravity of such solutions as produced ranges for the lower ratios from about 60° Bé. to about 40° Bé. for the higher ratios and these solutions are then diluted to suit various uses down as far as 15° Bé. The viscosity of such solutions varies of course with the composition and concentration; their surface tension is, however, more dependent upon the composition, or $Na_2O:SiO_2$ ratio, than the concentration. A 20° Bé. sodium silicate solution of a 1:3.25 ratio has, for instance, a surface tension close to that of water, whereas a sodium silicate solution of a 1:1.94 ratio is about ⅔ that of water; as a rule we can say that increasing the alkalinity of a silicate solution decreases the surface tension of its solutions. A sodium metasilicate solution which has a ratio of 1:1 has a relatively low surface tension, but it has none of the properties which make silicate solutions available for film forming and adhesive purposes.

Similar conditions hold true for potassium silicate solutions.

In the following table we are giving surface tension figures of sodium silicate solutions containing wetting agents.

The determinations were made by the standard Du Nouy tensiometer tests as described, for instance, on page 72 of "Laboratory Manual of Colloid Chemistry" (1928) by H. N. Holmes; the figures are dynes per centimeter at 28° C. It was found necessary in using this test on concentrated silicate solutions to dilute with water to prevent the formation of surface films which would otherwise interfere with the tests, and the figures represent the results on solutions which had been diluted in the proportion of 2 parts by weight of the solution with 3 parts by weight of water. It is recognized that these results are not the true surface tensions of the commercial strength solutions, but the results are comparable as dilution does not materially affect the actual surface tension figures. The gravity of the solutions as diluted and tested is in the neighborhood of 20° Bé., i. e., within the range of strengths used for adhesive and film forming purposes.

*Surface tension of sodium silicate solutions containing wetting agents*

| Sodium silicate | Wetting agent | Per cent of wetting agent | Surface tension (dynes per centimeter) | Sodium silicate | Wetting agent | Per cent of wetting agent | Surface tension (dynes per centimeter) |
|---|---|---|---|---|---|---|---|
| Distilled water | | | 72.0 | IV | D | ½ | 30.8 |
| | | | | IV | D | ½ | 30.8 |
| | | | | III | E | ⅛ | 33.9 |
| I | | | 69.0 | III | E | ½ | 33.0 |
| I | A | ⅟₁₀₀₀ | 42.5 | IV | E | ⅛ | 32.6 |
| I | A | ⅟₁₀₀ | 36.8 | IV | E | ½ | 34.0 |
| I | A | ½ | 33.8 | III | F | ⅛ | 31.0 |
| I | A | ½ | 32.9 | III | F | ½ | 30.7 |
| I | A | 1 | 32.3 | IV | F | ⅛ | 31.6 |
| II | | | 53.9 | IV | F | ½ | 31.0 |
| II | A | ⅟₁₀₀₀ | 49.0 | III | G | ⅛ | 35.4 |
| II | A | ⅟₁₀₀ | 34.2 | III | G | ½ | 32.0 |
| II | A | ½ | 32.9 | IV | G | ⅛ | 34.0 |
| II | A | ½ | 33.1 | IV | G | ½ | 33.6 |
| V | | | 46.9 | III | H | ⅛ | 41.3 |
| V | A | ½ | 33.3 | III | H | ½ | 39.2 |
| III | B | ½ | 40.5 | IV | H | ⅛ | 36.8 |
| III | B | ½ | 38.2 | IV | H | ½ | 36.6 |
| IV | B | ½ | 39.9 | I | Amylalcohol saturated | | 49.2 |
| IV | B | ½ | 38.5 | | | | |
| III | C | ½ | 40.3 | I | Amylacetate saturated | | 49.7 |
| III | C | ½ | 40.3 | | | | |
| IV | C | ½ | 44.9 | Sodium meta silicate 25% solution without wetting agent. | | | 40.0 |
| IV | C | ½ | 45.5 | | | | |
| III | D | ½ | 32.1 | | | | |
| III | D | ½ | 31.8 | | | | |

The roman numerals and the letters in the above table represent the following:

I is a sodium silicate solution of original gravity of 41° Bé. of a composition 1Na₂O:3.25SiO₂.
II is a sodium silicate solution of original gravity of 45° Bé. and a composition 1Na₂O:2.8SiO₂.
III is a sodium silicate solution of original gravity of 42.5° Bé. and a composition 1Na₂O:3.25SiO₂.
IV is a sodium silicate solution of original gravity of 47.5° Bé. and a composition 1Na₂O:2.8SiO₂.
V is a sodium silicate solution of original gravity of 57° Bé. and a composition 1Na₂O:1.94SiO₂.

A is commercial butyl-naphthalene sodium sulfonate.
B is commercial benzyl-naphthalene sodium sulfonate.
C is saponin.
D is sulfonated olive oil.
E is sodium ricinoleate.
F is sodium linoleate.
G is sulfonated fish oil.
H is a sulfonated, sulfurized petroleum oil.

The percentage of wetting agent is based on weight of the original concentrated solution.

The surface tension of the silicate Solution I is practically the same as that of Solution III and that of II is the same as that of IV.

Comparing these figures it will be seen that while increasing the Na₂O:SiO₂ ratio from for instance, Solution I, 1:3.25 to the meta silicate of ratio 1:1, the surface tension is decreased from 69 to 40. By the addition of a wetting agent to such solutions the surface tension of the high silica solution is considerably decreased, in most instances to below that of the meta silicate and far below that of water or the original silicate.

The practical and useful effect of this is shown by the spread of the silicate solution when applied as a film to various surfaces. A convenient test for this was made as follows: The solution under test was painted as a heavy coating over a piece of wax sized kraft paper. After the film had dried the amount of the original area covered by a silicate film was noted as estimated percentage of the area originally painted: the higher the percentage the better is the spread or covering power. The results are easily reproduced and are duplicated within ± 5%. Similar results are obtained on enameled steel surfaces. Results of these tests are given in the attached table. Roman figures and letters are used therein to designate the same materials as in the preceding table, the silicate solutions were used undiluted at the gravities mentioned.

*Spread of sodium silicate solutions containing wetting agents*

| Sodium silicate | Wetting agent | Per cent of wetting agent | Per cent spread on | |
|---|---|---|---|---|
| | | | Waxed paper | Enameled steel |
| I | | | 30 | 50 |
| II | | | 30 | 50 |
| II | A | ¼ | 100 | 100 |
| II | A | ¼ | | 100 |
| II | A | ⅟₁₆ | | 95 |
| II | B | ¼ | 100 | |
| II | Acetaldehyde | ¼ | 100 | 95 |
| II | Sulfonated castor oil potassium salt | ¼ | 100 | 100 |
| II | Ammonium palm-olive soap | ¼ | 100 | |
| II | Sulfonated corn oil | ¼ | 100 | |
| II | Tri-ethanol amine salt of sulfonated cotton seed oil | ¼ | 100 | |
| II | D | ¼ | 100 | |
| II | Oleic acid | ¼ | 100 | |
| II | Oleic acid | ¼ | 98 | |
| II | Potassium resinate | ¼ | 100 | |
| I | A | ¼ | | 100 |
| I | D | ¼ | | 100 |
| I | C | ¼ | | 90 |
| I | F | ¼ | | 100 |

These sodium silicate solutions of low surface tension and great spread have numerous technical applications.

We found that such modified sodium silicate solutions are very efficient adhesives for the joining of insulating material of various types to enameled steel sheets in the manufacture of office partitions, metal doors, etc. These modified silicate solutions when applied to painted steel remain in even films and do not tend to draw together into spherical drops which make it difficult to obtain a satisfactory bond.

In the manufacture of many paper specialties a waxed or highly sized, water repellant paper is used. Such materials are difficult to bond with ordinary grades of sodium silicate solutions. We found that a much better bond is obtained when sodium silicate solutions of lowered surface tension, containing a wetting agent, are used as adhesives in such cases.

In the manufacture of steel drums a certain amount of oily or greasy material remains on the steel inside the drums from the fabricating operations. Such drums are difficult to coat with ordinary sodium silicate solutions. Much more even coatings are obtained when our novel solutions of low surface tension are used to coat such drums. Such silicate coatings make steel containers available for shipment of dry or semi-solid materials, such as foodstuffs, for which ordinary uncoated or oily metal containers can not be used.

Alkali-metal silicates are often used as paint vehicles and as protective coatings on a large number of different materials. We have found that the silicate solutions with low surface tension containing a wetting agent are much easier to apply in an even film than solutions of similar gravity and composition, but with a high surface tension. The difference between these materials is especially noticeable where such coatings are applied over surfaces which have localized spots or blotches of oil, grease, wood resin, dust and other fine particles usually difficult to wet with silicate solutions.

It is realized that both powdered and solutions of sodium silicate have been added to soaps to produce improved detergent compositions which are used in dilute aqueous solutions. It has been customary to use a preponderance of soap in such mixtures. The dilute washing solutions obtained from such composition have absolutely no film forming or adhesive properties. If one should attempt to produce concentrated solutions, say about 15° Bé., of such compositions one would find this impossible, as at such concentrations a salting out action takes place and the large amount of soap present in aqueous concentrated mixtures or pastes of sodium silicate and soaps completely prevents the silicate from displaying its adhesive and film-forming properties.

The combined effect of lowered surface tension and adhesive, film forming properties is only obtained in concentrated silicate solutions, meaning of a gravity above 15° Bé. and the presence in the solution of less than 2% of the wetting agent. At lower gravities and increased amount of wetting agent the adhesive, film-forming properties are impaired to a point where they become of no practical value. Similarly the composition of the silicate is another determining factor in the preparation of our novel compositions. Silicate solutions of a greater alkalinity than 1:1.5 or a greater silica content than corresponds to the ratio 1:3.5 are of no practical value for adhesive film-forming properties.

Compositions within the above limits were all found to have improved spreading and adhesive properties and to have numerous technical applications for which straight silicate solutions are seldom usable.

The results of the various tests submitted above show that salt forming wetting agents seem to be the most efficient in reducing the surface tension of silicate adhesives. In most instances amounts up to ½% reduce the surface tension of the solution below that of the meta-silcate. Above about ½% no further material reduction of the surface tension takes place, but when this amount exceeds about 2% certain detrimental effects of the presence of the wetting agent become noticeable.

Our novel compositions can be used in combination with thickening agents, such as flour, soy bean meal, clay and others without losing their improved spreading and adhesive properties.

We claim:

1. As an adhesive, and a film forming composition a concentrated alkali-metal silicate solution containing less than 2% of a wetting agent selected from the group consisting of naphthalene sulfonic acids containing a hydrocarbon substituent in their nucleus, sulfonic acids of complex higher hydrocarbons, sulfonated oily substances, high molecular carboxylic acids, bile acids, aldehydes, saponin, high boiling mono-hydroxy alcohols and esters.

2. As an adhesive, and a film forming composition a concentrated alkali-metal silicate solution containing less than 2% of a wetting agent selected from the group consisting of naphthalene sulfonic acids containing a hydrocarbon substituent in their nucleus, sulfonic acids of complex higher hydrocarbons, sulfonated oily substances, high molecular carboxylic acids and bile acids, said composition having a surface tension substantially lower than that of an alkali-metal silicate solution of similar composition free from said wetting agent.

3. An adhesive, and a film forming composition comprising a sodium silicate solution of a specific gravity about 15° Bé. and a composition within the range of ratios of $Na_2O:SiO_2$ of 1:1.5 and 1:3.5 and less than 2% of a wetting agent selected from the group consisting of naphthalene sulfonic acids containing a hydrocarbon substituent in their nucleus, sulfonic acids of complex higher hydrocarbons, sulfonated oily substances, high molecular carboxylic acids, bile acids, aldehydes, saponin, high boiling mono-hydroxy alcohols and esters, said composition having a surface tension less than that of a sodium silicate solution of similar concentration and composition free from said wetting agent.

4. An adhesive, and a film forming composition comprising a sodium silicate solution of a specific gravity above 15° Bé. and a composition within the ratios of $Na_2O:SiO_2$ of 1:1.5 and 1:3.5 and less than 2% of a wetting agent selected from the group consisting of naphthalene sulfonic acids containing a hydrocarbon substituent in their nucleus, sulfonic acids of complex higher hydrocarbons, sulfonated oily substances, high molecular carboxylic acids, bile acids, aldehydes, saponin, high boiling mono-hydroxy alcohols and esters, said composition when adjusted to a concentration of about 20° Bé. having a surface tension less than 40 dynes per cm. when tested at 28° C. by the standard Du Nouy tensiometer test.

PAUL C. LEMMERMAN.
WILLIAM K. SCHWEITZER.